US007324952B2

(12) United States Patent
Hisano (10) Patent No.: US 7,324,952 B2
(45) Date of Patent: Jan. 29, 2008

(54) INSURANCE METHOD, INSURANCE SYSTEM, TRANSACTION MONITORING METHOD, TRANSACTION MONITORING SYSTEM, AND PROGRAM

(75) Inventor: Keizo Hisano, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 1214 days.

(21) Appl. No.: 10/229,620

(22) Filed: Aug. 27, 2002

(65) Prior Publication Data

US 2003/0046115 A1 Mar. 6, 2003

(30) Foreign Application Priority Data

Aug. 29, 2001 (JP) .............................. 2001-259950

(51) Int. Cl.
*G06Q 40/00* (2006.01)
*G06F 15/16* (2006.01)

(52) U.S. Cl. .......................................... 705/4; 709/217
(58) Field of Classification Search .................... 705/4; 709/217
See application file for complete search history.

(56) References Cited

U.S. PATENT DOCUMENTS

| 5,189,700 | A | * | 2/1993 | Blandford | .................... 713/178 |
| 5,884,274 | A | * | 3/1999 | Walker et al. | .................. 705/4 |
| 6,122,633 | A | * | 9/2000 | Leymann et al. | ............. 707/10 |
| 6,421,687 | B1 | * | 7/2002 | Klostermann | ............... 707/202 |
| 6,922,720 | B2 | * | 7/2005 | Cianciarulo et al. | ........ 709/217 |
| 2001/0034621 | A1 | * | 10/2001 | Kirsh et al. | ..................... 705/4 |
| 2002/0026335 | A1 | * | 2/2002 | Honda | ........................... 705/4 |
| 2003/0040942 | A1 | * | 2/2003 | Hooten | ......................... 705/4 |

FOREIGN PATENT DOCUMENTS

| JP | 2000-207453 | 7/2000 |
| JP | PUPA 2000-261483 | 9/2000 |
| JP | PUPA 2001-160092 | 6/2001 |
| JP | PUPA 2001-202428 | 7/2001 |
| JP | PUPA 2002-279185 | 9/2002 |

OTHER PUBLICATIONS

Schneier, Insurance and the Computer Industry, Mar. 2001, Communications of the ACM, vol. 44 No. 3, 114-115.*

Majuca, The evolution of cyberinsurance, ACM Computing Research Repository (CoRR), tech. report cs.CR/0601020, Jan. 2006.*

(Continued)

*Primary Examiner*—C. Luke Gilligan
*Assistant Examiner*—Tran N Nguyen
(74) *Attorney, Agent, or Firm*—Schmeiser, Olsen & Watts; William E. Schiesser (57) ABSTRACT

After an insurance application is made from a user, an insurance provider examines the application and makes an insurance contract. The insurance provider sends a transaction monitoring program (BTM) to the user, and the user installs this. Transaction data which the user communicates with a transaction party are monitored by the BTM and recorded in a transaction record. If the user incurs loss or damage, the user sends the transaction record to the insurance provider, and the insurance provider then analyzes this to verify the cause of the loss and pays insurance money.

11 Claims, 5 Drawing Sheets

OTHER PUBLICATIONS

Greenberg, AIG unveils e-commerce insurance plans, Jan. 18, 2000, E-Commerce Times, <http://www.ecommercetimes.com/story/2259.html>.*

Conley, Outwitting cybercriminals, Jul. 2000, Risk Management v47n7 pp. 18-26.*

Radcliff, Got cyber insurance?, Aug. 21, 2000, Computerworld, <http://www.computerworld.com/printthis/2000/0,4814,48721,00.html>.*

Flynn, Insuring against hackers comes with a catch, Jun. 15, 1998, The New York Times, <http://www.nytimes.com/library/tech/98/06/biztech/articles/15briefs.html>.*

Poletti, First-ever insurance against hackers, Jun. 14, 1998, Reuters.*

Moukheiber, Got a hacker policy?, Nov. 16, 1998, Forbes, <http://www.mywire.com/pubs/Forbes/1998/11/16/1012876/print>.*

Lai, Endorsements, licensing, and insurance for distributed system services, Mar. 1995, MIT Workshop on Internet Economics, <http://www.press.umich.edu/jep/works/LaiEndorse.html>.*

Raz, Software risk management and insurance, 2001, Position paper for EDSER-3 at the 23rd ICSE-2001.*

Davis, Cigna offers anti-hacker insurance, Oct. 5, 1998, TechWeb, <http://www.techweb.com/wire/story/TWB19981005S0010>.*

* cited by examiner

INSURANCE METHOD, INSURANCE SYSTEM, TRANSACTION MONITORING METHOD, TRANSACTION MONITORING SYSTEM, AND PROGRAM

FIELD OF THE INVENTION

The present invention relates to an insurance method and insurance system able to compensate for loss or damage resulting from unauthorized activities by a third party or device or communication line problems, for example, interfering with transactions conducted over a network such as the Internet. More particularly, the present invention relates to a technique that is effective for providing a verification method enabling an insurance provider (insurance company) to determine whether communication that caused the loss or damage actually occurred by providing means for monitoring communication data in a user's computer system.

BACKGROUND ART

Electronic commerce conducted over a network such as the Internet has become popular as a result of advances in computer and network technologies. As with other common transactions, a contract is established in the electronic commerce conducted over a network as a result of an offer being made and then accepted. Economic activities such as business transactions are conducted based on this contract system. Communication over a network is performed by exchanging electronic data, and the offer and its acceptance are likewise conducted by exchanging electronic data. More specifically, electronic (digital) messages exchanged over a network are used to express the offer and acceptance on which a transaction is premised.

Invasion of privacy resulting from leaking, stealing, tampering with, or illegally selling personal information about the parties to a transaction is a particular concern for conducting electronic commerce over a network. It is therefore desired that some means for compensating for such invasion of privacy through insurance is provided. The electronic commerce system taught in Japanese Patent Laid-Open Publication 2000-207453 is one example of a system providing such means. This electronic commerce system is structured to use insurance premiums to compensate for a loss incurred as a result of an invasion of privacy in conjunction with an electronic commerce transaction when a party involved in the transaction conducted over an electronic network or a related party has an insurance contract with an insurance company.

Various risks other than losses from the invasion of privacy (personal information) are also present in a networked environment. Examples of such risks include loss or damage resulting from lack of mutual understanding between parties, and loss or damage resulting from computer viruses.

Lack of mutual understanding between parties could occur in the following cases. One example is loss of data such as when a message sent by one party does not reach the other party. When messages are exchanged as electronic data, a natural person is unable to make an expression of intention directly, and the expression of intention must first be converted to electronic data which is then sent. In other words, a computer system or other such data processing device is required as a means for expressing intent. When expressing an intention by such means, there is a danger of operating the computer system so that the opposite of the user's true intention is expressed. There are also cases in which a breakdown of the computer system or network prevents the intention being expressed even though an attempt has been made. Due to such reasons, a problem of losses or damages would occur to one or both of parties to the transaction, which might not occur if messages were conveyed correctly.

Also, a wide variety of computer viruses are present on the network, and there is an obvious risk of attacks by such viruses. Losses resulting from interference with transactions by the computer viruses may occur.

The likelihood of losses and damages being incurred, and the value of those losses, will continue to increase as transactions conducted with computers and networks become more sophisticated and complex, and as the number and value of the transactions increase. As such losses occur, the burden of compensating for those losses may become excessive for the parties to the transaction. Such losses and damages could therefore easily become an obstacle to the sound development of commercial transactions conducted over computer networks. There is therefore a growing need for insurance to compensate for such losses and damages.

The electronic commerce system having an insurance function disclosed in the cited Publication could also cope with risks other than the invasion of privacy. However, if risks resulting from interference with the exchange of messages as part of a transaction are to be insured, it is necessary to accurately determine what transactions and communications were actually conducted over the network. More specifically, it is necessary to monitor and record the content of all network communications without fail. The electronic commerce system cited above, however, has no means for monitoring the communicated data. It is also necessary to prevent the recorded transaction content from being tampered with in order to assure the accuracy of the recorded content.

SUMMARY OF THE INVENTION

An object of the present invention is therefore to provide a means for accurately and automatically recording the content of communications (transactions) conducted over a computer network. A further object of the present invention is to provide a means for preventing the recorded transaction content from being tampered with. A yet further object of the present invention is to provide a means for protecting the transaction record from hardware failures.

A yet further object of this invention is to provide an insurance method and system in which the insurance contract content is fairly enforced using the transaction recording means. A further object is to provide an insurance method and system enabling easier evaluation of conditions for paying insurance money.

The present invention is summarized below. That is, an insurance method according to the present invention includes the steps of sending a transaction monitoring program to either a computer system of a user or a computer system determined by mutual agreement with the user, according to an insurance contract with the user; receiving, from the user, a claim for payment of insurance money based on the insurance contract, receiving a transaction record recorded by the transaction monitoring program together with or separately from the claim, analyzing the transaction record, determining whether a transaction causing a loss on the user exists by referring to the results of the analyzing step, and paying the insurance money to the user if the determining step affirms and other conditions for payment of the insurance money are satisfied.

This insurance method can easily verify the existence of a communication proving the cause of a loss by referring to a transaction record recording a history of communications over a network. As a result, payment of insurance money can be made quickly.

This insurance method may also include the steps of receiving the transaction record at regular or irregular intervals, storing the received transaction record by associating with the user, and performing the analyzing step by referring to the latest transaction record received if a transaction record is not received with the claim. In this case, the transaction record can be received and stored not only at the time of claiming insurance money but also at any other time. Loss of the transaction record due to, for example, a failure of the user's computer system can thus be prevented.

Further, the entire content or part of the transaction record may be encrypted so as to be effectively unreadable by any party other than the insurance provider of the insurance contract. This prevents a party other than the insurance provider, such as the user, from tampering with the transaction record, and thus prevents fraudulent claims for insurance money.

Another insurance method according to the present invention includes the steps of receiving a transaction monitoring program according to an insurance contract with an insurance provider, installing the transaction monitoring program on one's own computer system or a computer system determined by mutual agreement with the insurance provider, exchanging data with a transaction party, recording, in a transaction record, a transaction involved in the data exchange by means of the transaction monitoring program, and sending, to a computer system of the insurance provider, either a claim for payment of insurance money based on the insurance contract, or both the claim and the transaction record when a loss has been incurred as a result of the data exchange with the transaction party. With this insurance method, the transaction record is collected automatically by the transaction monitoring program. In addition to the convenience of collecting the transaction record automatically, the transaction monitoring program is also useful to prevent the willful creation of a fraudulent record by the user. Fair insurance claims can thus be systematically assured, and the evidential value of the transaction record can be enhanced.

The transaction record may be sent to a computer system of the insurance provider at regular or irregular intervals irrespective of whether a loss has been incurred. This can cope with unintentional loss of the transaction record due to, for example, a computer system failure.

The entire content or part of the transaction record may be encrypted so as to be effectively unreadable by any party other than the insurance provider. Tampering with the transaction record by the user or any other party can thus be prevented.

A transaction monitoring method according to the present invention is a method for monitoring a transaction of communication with any party through a network including the steps of capturing communication data sent or received by one party to the communication, recording, in a transaction record, the communication data together with the identity of the other party, date and time of the communication, and other attribute data, encrypting the entire content or part of the transaction record so as to be effectively unreadable by at least the one party, and sending the encrypted transaction record at regular or irregular intervals to a computer system of a third party that can decrypt the encrypted transaction record. This transaction monitoring method prevents a user originating a transaction from tampering with the transaction record, and thus improves the fairness and evidential value of the transaction record monitored.

This transaction monitoring method may further include the steps of generating a hash value for the communication data and attribute data; encrypting the hash value using a public key corresponding to a private key held by the third party, and recording the communication data, attribute data, and encrypted hash value to the transaction record. This method generates a hash value representative of the actual transaction record content and encrypts the hash value, thereby enabling tampering to be detected without actually encrypting all of the actual content of the transaction record. Anyone can reference the content of the transaction record in this case because the actual transaction record content is not encrypted, but if the content is then changed the hash value generated from the content will differ from the encrypted hash value. Tampering can thus be detected by comparing the decrypted hash value with the hash value generated from the current content.

The present invention can also be understood as a system invention or a program invention in addition to the method invention described above.

PREFERRED EMBODIMENTS OF THE INVENTION

The preferred embodiments of the present invention will next be described. It is noted that the invention can be implemented in many different ways, and the invention should not be interpreted as being limited to the specific contents of the following embodiments. In the following, like reference numerals are used for like elements, respectively.

The preferred embodiments described below refer primarily to a method or system, but it will be obvious to one with ordinary skill in the related art that the present invention can also be implemented as a computer-executable program. The invention can therefore be implemented by hardware, software, or a combination of hardware and software. The program can be recorded in any computer-readable medium such as CD-ROM, hard disk drive, optical storage, or other magnetic storage.

A general computer system may be used in the following embodiments as a data processing system needed to implement the invention. The computer system that can be used in the embodiments has a central processing unit (CPU), main memory (RAM), nonvolatile memory (ROM), coprocessor, graphics accelerator, cache memory, input/output (I/O) controller, and other hardware resources such as found in a typical computer system. The computer system may also have a hard disk drive or other external storage device, and a communication means for connecting to the Internet or other network. The computer system may be a personal computer, workstation, mainframe computer, or other type of computer.

Figure 1:
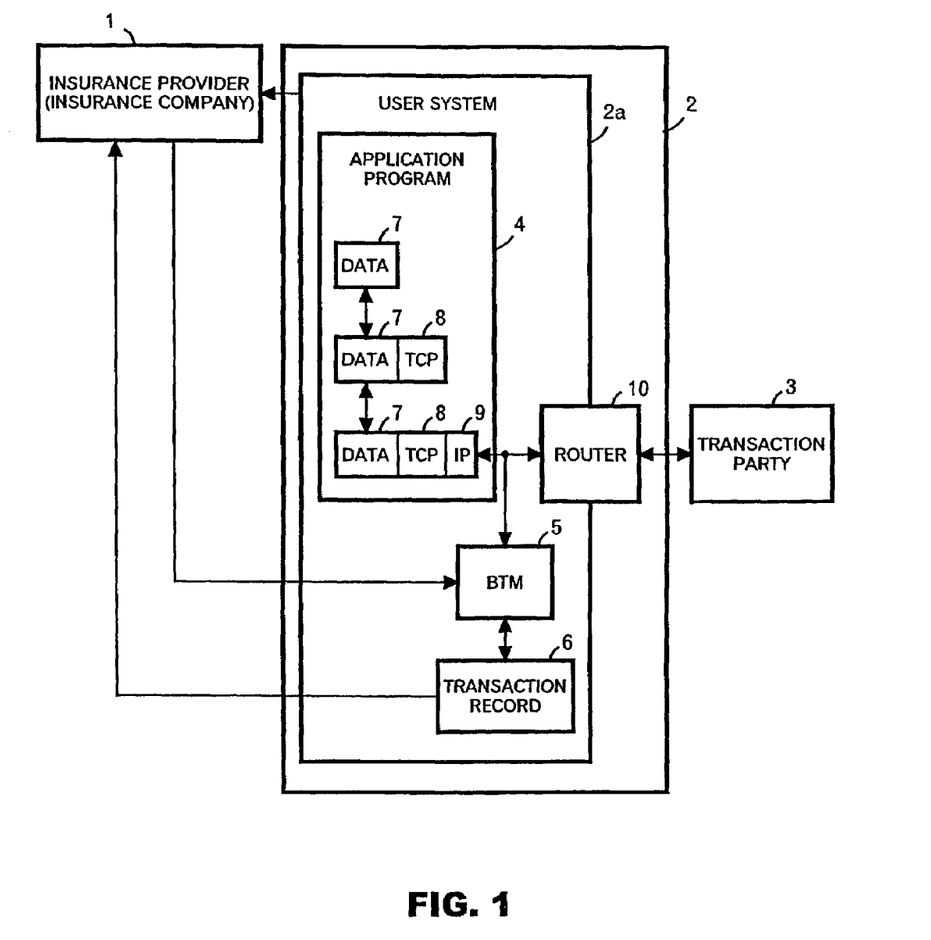
FIG. 1 shows an insurance system and insurance method according to a preferred embodiment of the present invention.

FIG. 1 shows the concept of the insurance system and insurance method according to a preferred embodiment of the present invention. An insurance provider 1, user 2, and transaction party 3 are participants in this insurance system and insurance method.

Insurance provider 1 is an insurance company, for example, providing the insurance service enabled by this embodiment of the invention. Insurance provider 1 might not be part of the insurance company, and may be a broker, for example, providing the insurance service enabled by this embodiment of the invention on behalf of the insurance company. Also, the insurance underwriter might not be insurance provider 1 or insurance company offering the insurance, and may be a separate entity. The insurance could be added to reinsurance. Insurance provider 1 has a computer system as described above, and implements the insurance system and insurance method described below using this computer system.

User 2 is the insured, that is, a party receiving the insurance service of the present embodiment through an insurance contract. When user 2 suffers a loss as a result of a network transaction with the transaction party 3, or when user 2 is held liable for such loss, user 2 is compensated for such a loss or damage to the extent of the coverage of the insurance contract. User 2 has a user system 2a. User 2 uses this user system 2a to conduct business (transactions) with transaction party 3. User system 2a is not necessarily a physically independent computer system, and may be a distributed computer system having terminals and components connected via a LAN (local area network) or other network. User system 2a may be a conventional computer system as described above, or it may be a cell phone or PDA (personal digital assistant).

Transaction party 3 can be any party conducting a transaction with user 2 over a network. It will therefore be obvious that transaction party 3 also has a computer system as needed to conduct a transaction over a network, and uses this computer system to conduct the transaction. While FIG. 1 shows only a single transaction party 3, there may be a plurality of transaction parties 3.

User system 2a has a browser, e-mail program, or other application program 4, transaction monitoring program (BTM) 5, and transaction record 6.

Application program 4 may be a browser or e-mail program. The browser handles sending HTTP (Hypertext Transfer Protocol) requests to a server, and receiving and displaying responses from the server. The e-mail program handles sending and receiving e-mail according to a protocol such as SMTP (Simple Mail Transfer Protocol) or POP (Post Office Protocol).

Application program 4 internally processes data 7. Data 7 is divided into packets of an appropriate size to which a TCP (Transmission Control Protocol) header 8 is added. An IP (Internet Protocol) header 9 is then added to generate an IP packet. Each IP packet consists of an IP header 9, TCP header 8, and data 7. In this embodiment, a network communication is illustrated in which such an IP packet is used as a unit of communication.

The IP packets are routed through a router 10 to transaction party 3. Router 10 also passes IP packets routed from transaction party 3 to application program 4.

Transaction monitoring program 5 receives the sent and received IP packets and monitors communication transactions. Transaction monitoring program 5 also has a function for recording a transaction history in the form of transaction record 6.

Figure 2:
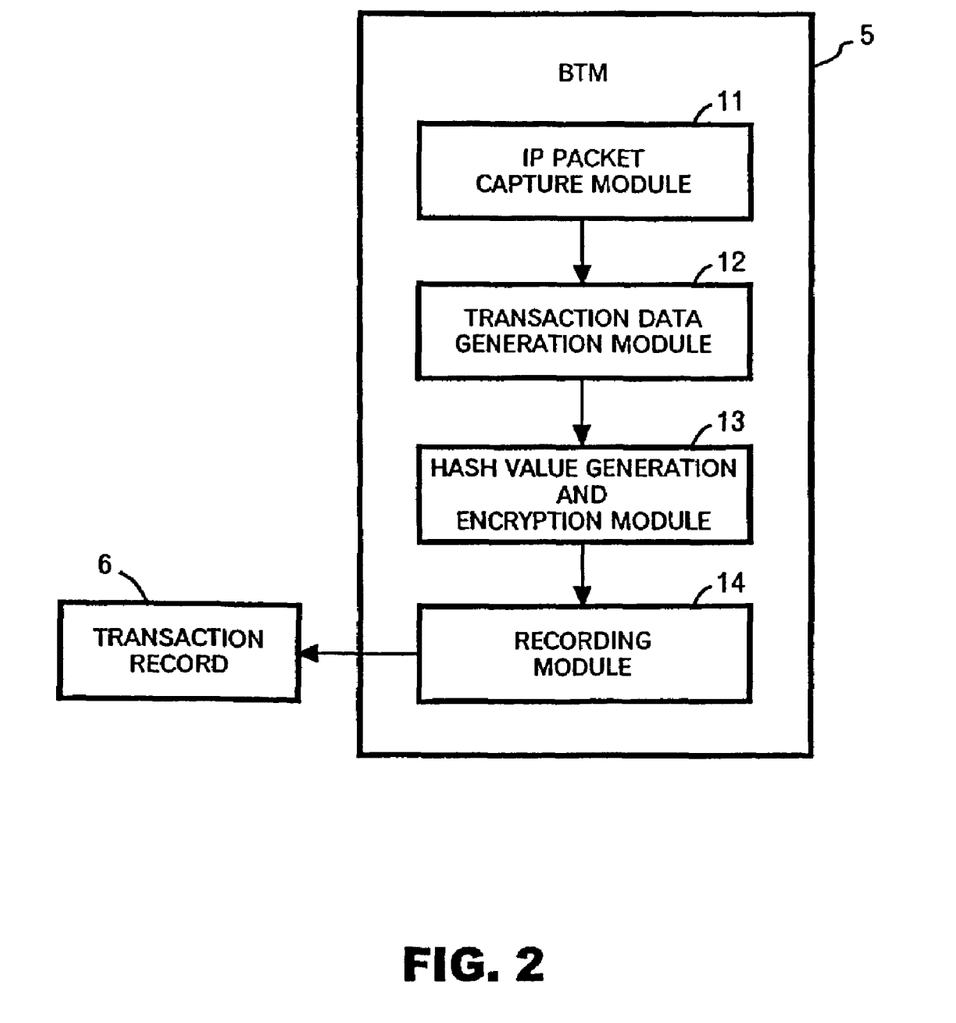
FIG. 2 is a block diagram showing the functions of an exemplary transaction monitoring program 5.

FIG. 2 is a block diagram showing the functions of an exemplary transaction monitoring program 5. Transaction monitoring program 5 has an IP packet capture module 11, transaction data generation module 12, hash value generation and encryption module 13, and recording module 14.

IP packet capture module 11 captures IP packets transferred between application program 4 and router 10.

Transaction data generation module 12 interprets the IP header 9 and TCP header 8 in an IP packet, and generates, for the same communication partner, transaction data for each communication, each session, or each communication partner.

The hash value generation and encryption module 13 generates (computes) a hash value for the transaction data generated by transaction data generation module 12, and encrypts the hash value. Encryption may be performed using the public key cryptography, for example, with a public key of insurance provider 1. It is well known that the content (hash value) encrypted with the public key cannot be decrypted in any practical amount of decryption time without using a corresponding private key. Insurance provider 1 must securely keep the private key.

Recording module 14 records the transaction data and encrypted hash value as a data set in transaction record 6.

Transaction monitoring program 5 in the insurance system of this embodiment thus accurately and conveniently records the communication content of user 2. It is therefore easy to verify the existence or nonexistence of communication said to be cause of loss or damage incurred by the user. When a claim for insurance money is made, transaction record 6 is analyzed to accurately determine the actual communications, so that a fair and fast investigation of whether to pay the insurance money can be made. Furthermore, encrypting at least part of transaction record 6 also makes transaction record 6 resistant to tampering with by the user or some third party. The fairness or integrity of transaction record 6 is thus assured, and the effectiveness of transaction record 6 as evidence of actual communications is thus improved.

Figure 3:
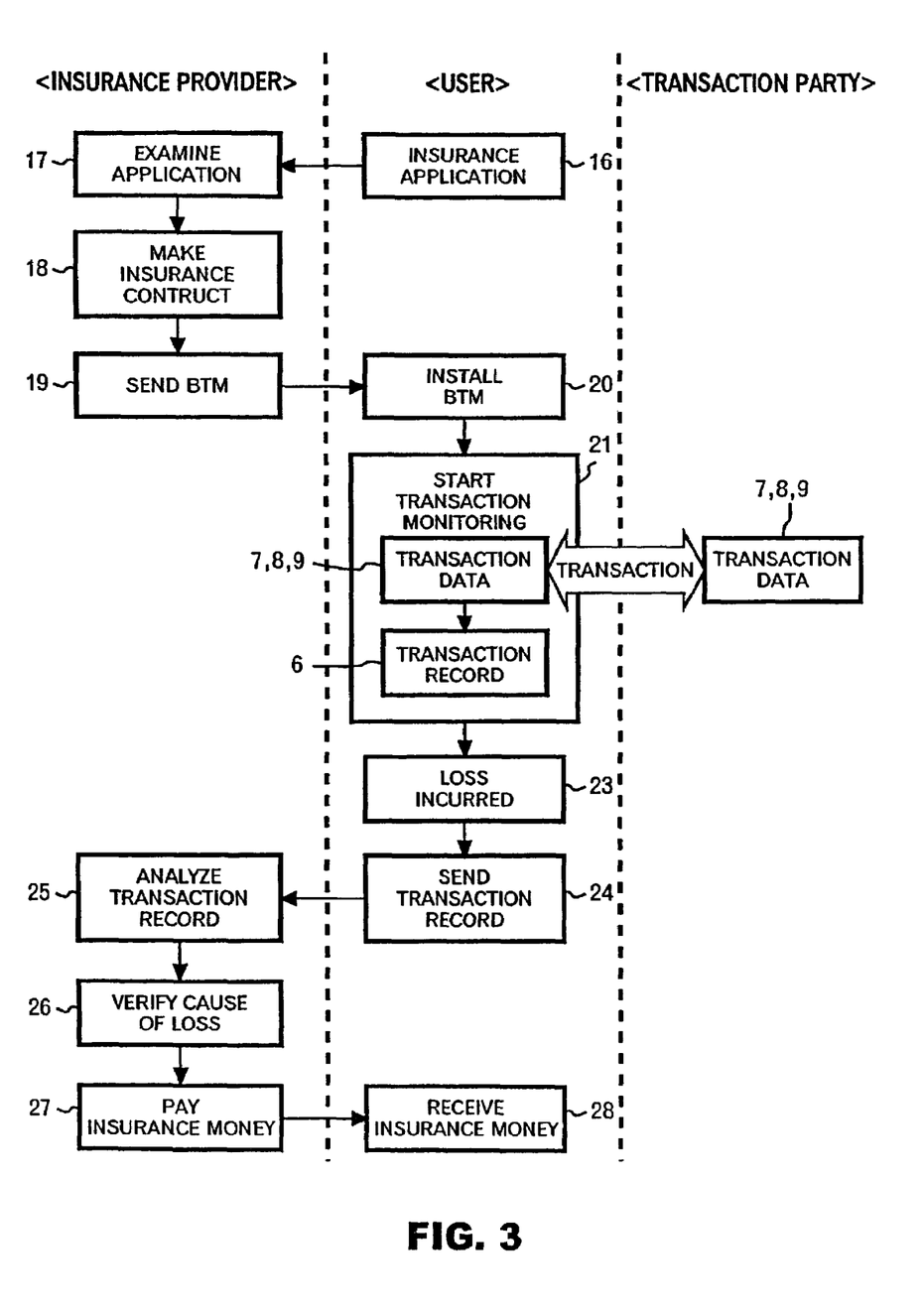
FIG. 3 is a flow chart of an insurance method according to a preferred embodiment of the present invention.

An insurance method according to the present embodiment is described next. FIG. 3 is a flow chart of an insurance method according to a preferred embodiment of this invention. The steps processed by insurance provider 1 are shown in the left column in FIG. 3, the steps at user 2 are shown in the middle column, and the steps at transaction party 3 are shown in the right column.

First, user 2 applies for insurance (step 16). The insurance application may be made, for example, by user 2 accessing a web site of insurance provider 1 on the Internet, providing information required by insurance provider 1, and then sending the completed application to insurance provider 1. Note that applying for insurance is not be limited to such electronic means, and user 2 could alternatively apply by regular mail, facsimile, telephone, or by meeting with an insurance agent.

Insurance provider 1 then examines the application (step 17). Insurance provider 1 refers to the information provided on the application to determine whether an insurance contract can be made. If the application is approved, an insurance contract is made (step 18). Note that important insurance contract terms such as insurance limit and premium can be calculated by insurance provider 1 on the basis of the required data submitted by user 2 when applying for insurance, and reported to user 2. The required data can be input and the calculation results can be displayed using HTTP requests and responses with the responses being displayed by the browser.

After the contract is made, insurance provider 1 sends transaction monitoring program 5 to user system 2a (step 19). User 2 then installs transaction monitoring program 5 on user system 2a (step 20). Note that the insurance contract normally does not take effect until the premium has been paid by user 2. In this embodiment of the invention, a period of insurance starts when the premium is paid and transaction monitoring program 5 starts running. The start of the period may be determined as desired in the contract. For example, its start time may be predefined by the contract.

Once transaction monitoring program 5 is installed, it begins monitoring transaction data (data 7, TCP header 8, and IP header 9) sent and received by application program 4 (step 21). Monitoring results are recorded in transaction record 6. Monitored are transaction data exchanged between user 2 and any transaction party 3.

Figure 4:
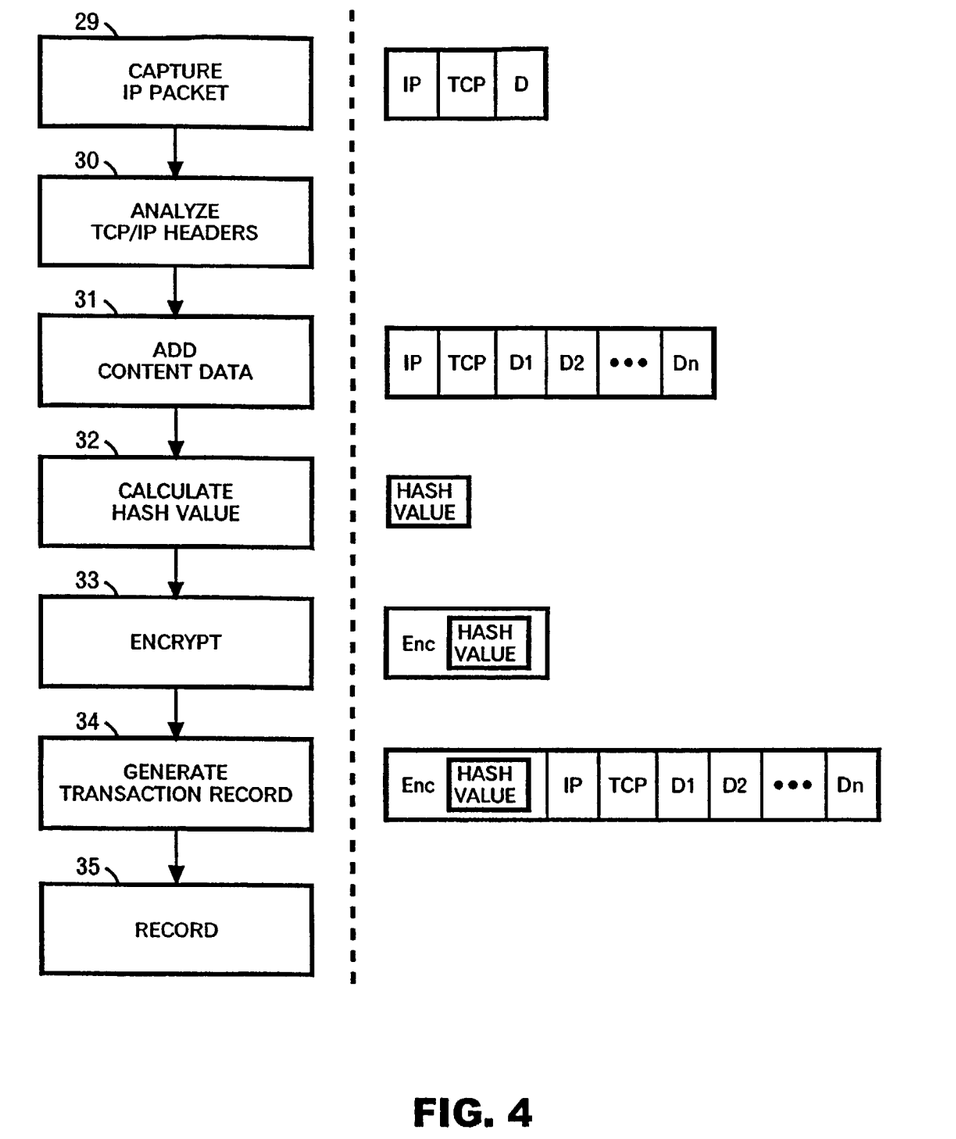
FIG. 4 is a flow chart of the transaction data monitoring process of the transaction monitoring program 5.

FIG. 4 is a flow chart of the transaction data monitoring process of transaction monitoring program 5. The blocks on the right side of the flow chart in FIG. 4 schematically show data formats at the respective steps.

Transaction monitoring program 5 captures every IP packet sent or received by application program 4 (step 29). As shown by the block to the right, the captured IP packet consists of an IP header (IP), TCP header (TCP), and data (D).

Transaction monitoring program 5 then analyzes the TCP/IP headers (step 30). The IP header and TCP header contain information about a destination, date, time, and the like. A set of data is generated by referring to such information. For example, if an IP packet does not reach the recipient, a resend request is output from the recipient. The IP packet is then resent in response to this resend request, but it is not particularly necessary to re-record the transaction data for the resent packet. Transaction data is therefore only recorded for one packet when the same packet is sent again. Information for omitting duplicate data is obtained at this step. Note that, by agreement of insurance provider 1 and user 2, the date and time information recorded in the TCP/IP headers may be obtained from a clock integrated in the computer system. Alternatively, the international standard time obtained by accessing to a time server on the Internet may be used.

As described above, a set of data is generated with any duplicate portion therein being removed. This is accomplished by adding data in a new packet to the recorded data for the header which has been determined to be identical to that analyzed (step 31).

A hash value is then generated or calculated for the set of data (step 32). This hash value can be calculated by using a known hash function.

The hash value is then encrypted with a public key according to the public key cryptography. If the data is tampered with, a hash value calculated from the tampered data will differ from the initially calculated hash value. Because the initially calculated hash value is encrypted, it is possible to determine whether the data has been tampered with by comparing with the decrypted hash value. More specifically, if the decrypted hash value is the same as the hash value for the current data, it can be determined that the data has not been tampered with. By encrypting only the hash value, it is possible both to determine whether there was any tampering and to enable anyone to reference the data itself. It is, of course, also possible to encrypt the entire data. In this case, however, no one other than the insurance provider 1 having the private key can reference the data content. Furthermore, if the entire data is encrypted, then a hash value is not needed. The encryption is not limited to the public key system, and the common key system (encrypting data with a single common key, in which case the common key must be kept securely) may be used.

A transaction record is then generated by combining the encrypted hash value and the set of data (content data) (step 34), and recorded in transaction record 6 (step 35). In this way, the transactions involved in the exchange of transaction data are monitored and the monitoring results are stored as a record (transaction record).

Returning to FIG. 3, if user 2 incurs loss or damage due to a communication failure or interference by a third party via the network during the transaction (step 23), user 2 submits a claim for insurance money and sends transaction record 6 to insurance provider 1 (step 24).

Insurance provider 1 then analyzes transaction record 6 (step 25) to verify the cause of the loss or damage (step 26). Once verified, insurance provider 1 pays the insurance money in accordance with the insurance contract (step 27). The user then receives the payment as compensation for the loss or damage (step 28). As described above, insurance provider 1 can detect any change in transaction record 6. Insurance provider 1 may therefore pay the insurance money after confirming that the transaction record has not been changed. The entire transaction record 6 may be encrypted so that no one other than insurance provider 1 can read or modify transaction record 6.

By using the insurance method according to this embodiment of the invention, user 2 receives the benefit of insurance coverage for potential risks in the network. Insurance provider 1 can accurately evaluate a complex transaction history using transaction monitoring program 5. Insurance provider 1 can also cope with tampering with transaction record 6 by using an appropriate encryption means. Knowing that the partner to transaction (user 2) has insurance, transaction party 3 can confidently conduct a transaction. Thus, risks of data loss in the network transactions and of interference from third parties can reduced, and the sound development of business conducted over a network can be expected.

While the present invention has been described in detail in connection with the preferred embodiments thereof, the present invention is not limited thereto, and various changes and modifications can be made without departing from the spirit of the present invention.

Figure 5:
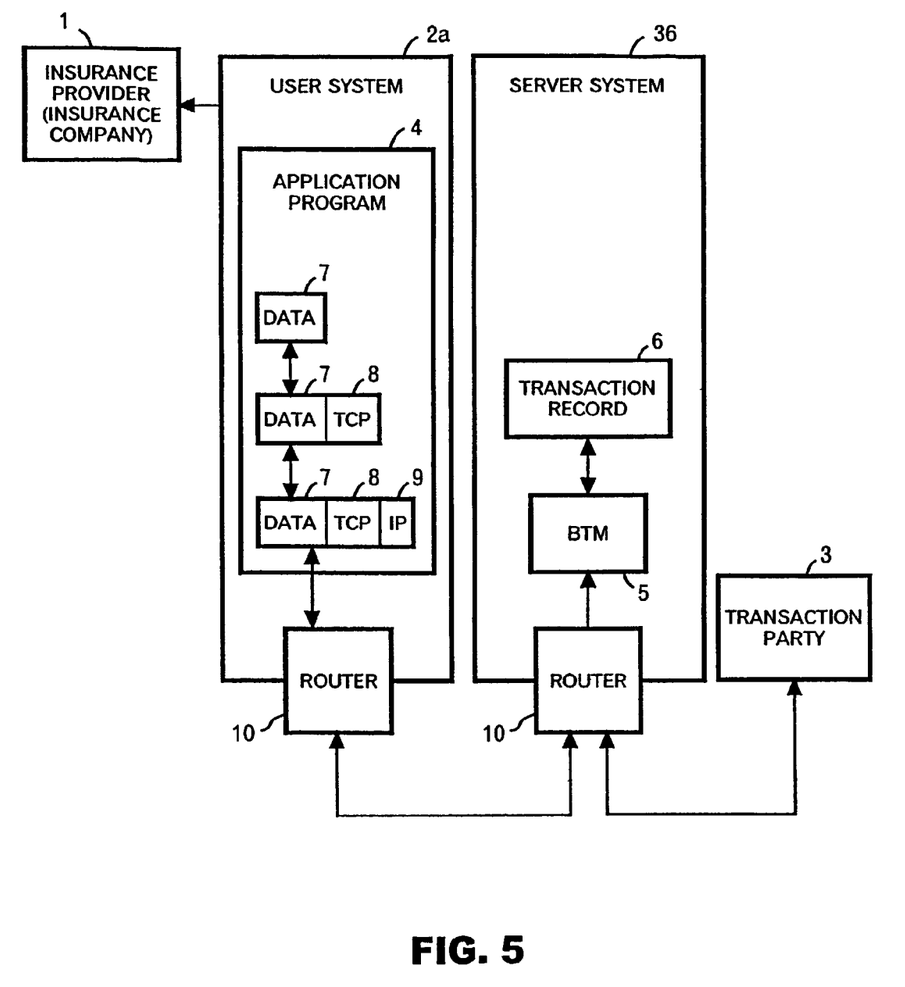
FIG. 5 shows the concept of an insurance system and insurance method according to another preferred embodiment of the invention.

As shown in FIG. 5, for example, transaction monitoring program 5 and transaction record 6 may be provided in a server system 36 other than user system 2a. In this case, the insurance contract requires that the user sends and receives the transaction data through server system 36.

Also, transaction record 6 may be sent at a desired time (regularly or irregularly) to insurance provider 1 or other designated system, and stored therein. By such distributed recording of transaction record 6, the insurance contract can still be fairly enforced even if, for example, user system 2a crashes or some other problem causing transaction record 6 to be lost occurs.

While the packets at the IP level are monitored to record a history of transaction data in the above embodiments, the packets at the TCP level may be monitored or even communication data at a higher layer (application level) may be monitored. Conversely, data at a level below the IP level, such as a network level or interface level, may be monitored.

Also, while the TCP is used as a protocol for the transport layer in the above embodiments, a different protocol such as UDP (user datagram protocol) may alternatively be used.

Advantages achieved by the typical embodiments of the present invention are as follows. The content of communications (transactions) conducted over a computer network can be accurately and automatically recorded. Tampering with the content of the transaction record can be prevented or detected. The transaction record can be protected from hardware-related problems.

What is claimed is:

1. An insurance method, comprising:

contracting, by a user with an insurance provider, to establish an insurance contract between the user and the insurance provider as a result of an offer having being made and then accepted, wherein the insurance contract insures the user against a loss suffered by the user due to a data failure in relation to exchanging electronic data between a user computer system of the user and a transaction party computer system of a transaction party over a communication network during a transaction between the user and the transaction party;

after the contract has been established, obtaining a transaction monitoring program for monitoring said exchanging electronic data between the user and the transaction party, wherein said obtaining comprises obtaining the transaction monitoring program by the user from the insurance provider;

after said obtaining, installing the transaction monitoring program on the user computer system;

after said installing, communicating packets of data, wherein said communicating packets of data is selected from the group consisting of transmitting the packets of data from an application program of the user computer system to the transaction party computer system and receiving the packets of data by the application program of the user computer system from the transaction party computer system, and wherein each packet consists of a header portion and packet data;

after said installing, monitoring said exchanging electronic data between the user and the transaction party, wherein said monitoring said exchanging electronic data comprises monitoring the transmitted or received packets, wherein the insurance contract stipulates that a period of insurance over which the user is insured by the insurance contract starts when both said monitoring is initiated and a premium for the insurance contract has been paid by the user to the insurance provider, wherein said monitoring is performed by the transaction monitoring program executing on a processor of the user computer system and comprises: capturing the transmitted or received packets, generating a transaction record whose content is derived from the captured packets; and storing the transaction record in a storage medium of the user computer system;

incurring a loss by the user due to a data failure in relation to the transmitted or received packets;

submitting a claim, by the user to the insurance provider, for the incurred loss, wherein said submitting the claim comprises retrieving the transaction record from the storage medium of the user computer system and sending the retrieved transaction record to an insurance provider computer system of the insurance provider; and after said submitting the claim, receiving an insurance payment of money, by the user from the insurance provider, for the incurred loss in accordance with the insurance contract after the insurance provider has analyzed the transaction record to determine a cause of the loss.

2. The method of claim 1, wherein said generating the transaction record comprises:

generating a set of data comprising the header portions and the packet data of the packets subject to the generated set of data not comprising duplicative header portions;

applying a hash function to the generated set of data to generate a hash value;

encrypting the hash value to generate an encrypted hash value; and forming the transaction record as a concatenation of the encrypted hash value and the generated set of data.

3. The method of claim 2, wherein said encrypting comprises encrypting the hash value with a public key of the insurance provider according to a public key cryptography in which a private key corresponding to the public key is exclusively possessed by the insurance provider.

4. The method of claim 1, wherein the application program is an e-mail program or a browser.

5. The method of claim 1, wherein said receiving the insurance payment occurs after the insurance provider has analyzed the transaction record to determine that the transaction record has not been changed.

6. The method of claim 1, wherein the method further comprises sending the transaction record from the user computer system to the insurance provider computer over regularly spaced time intervals.

7. The method of claim 1, wherein the method further comprises sending the transaction record from the user computer system to the insurance provider computer over irregularly spaced time intervals.

8. The method of claim 1, wherein the data failure is recited in the insurance contract to be a data communication failure with respect to said exchanging electronic data.

9. The method of claim 1, wherein the data failure is recited in the insurance contract to be an interference by a third party with said exchanging electronic data.

10. The method of claim 1, wherein said communicating packs of data consists of said transmitting the packets of data.

11. The method of claim 1, wherein said communicating packs of data consists of said receiving the packets of data.

* * * * *